UNITED STATES PATENT OFFICE.

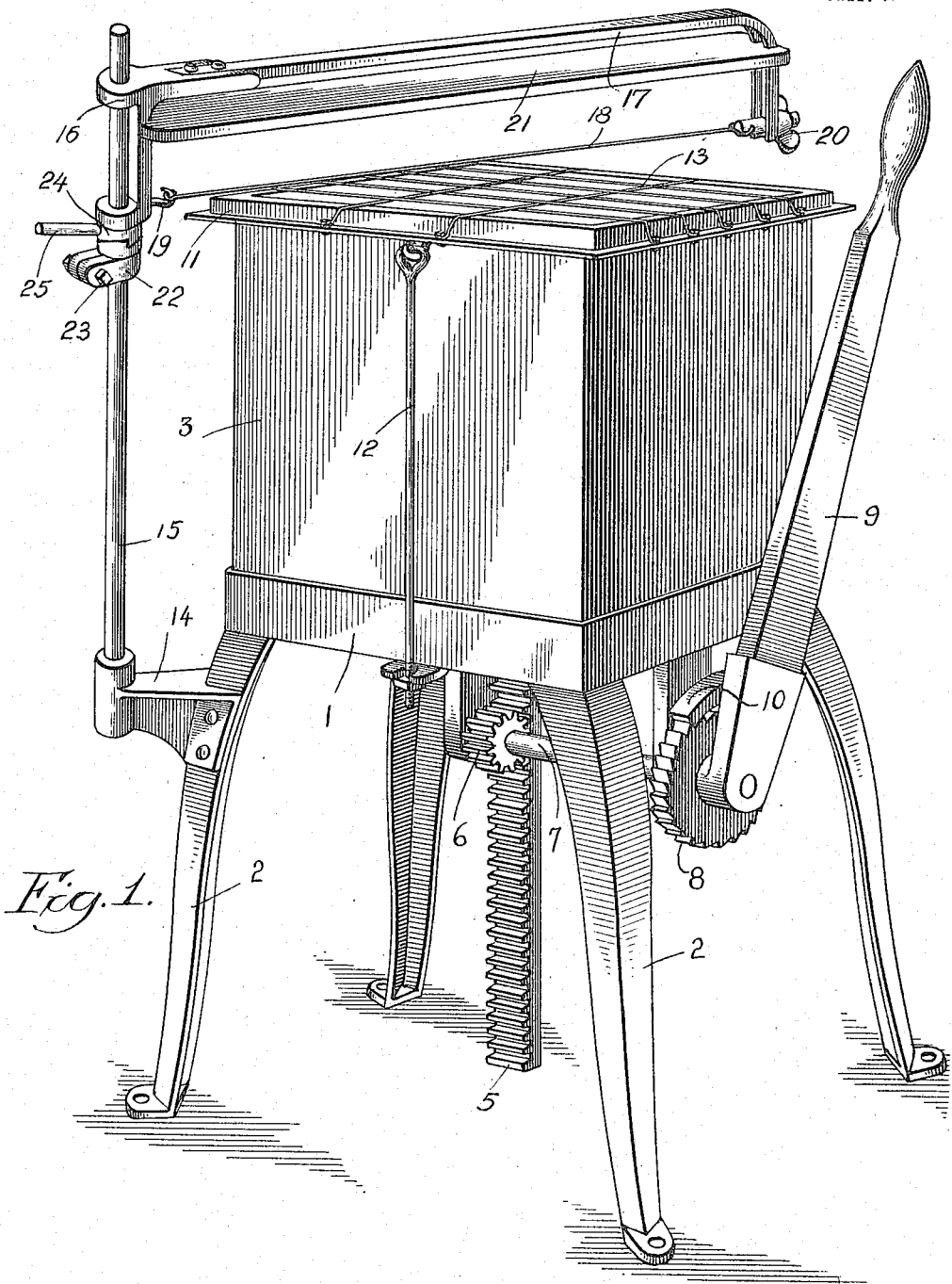

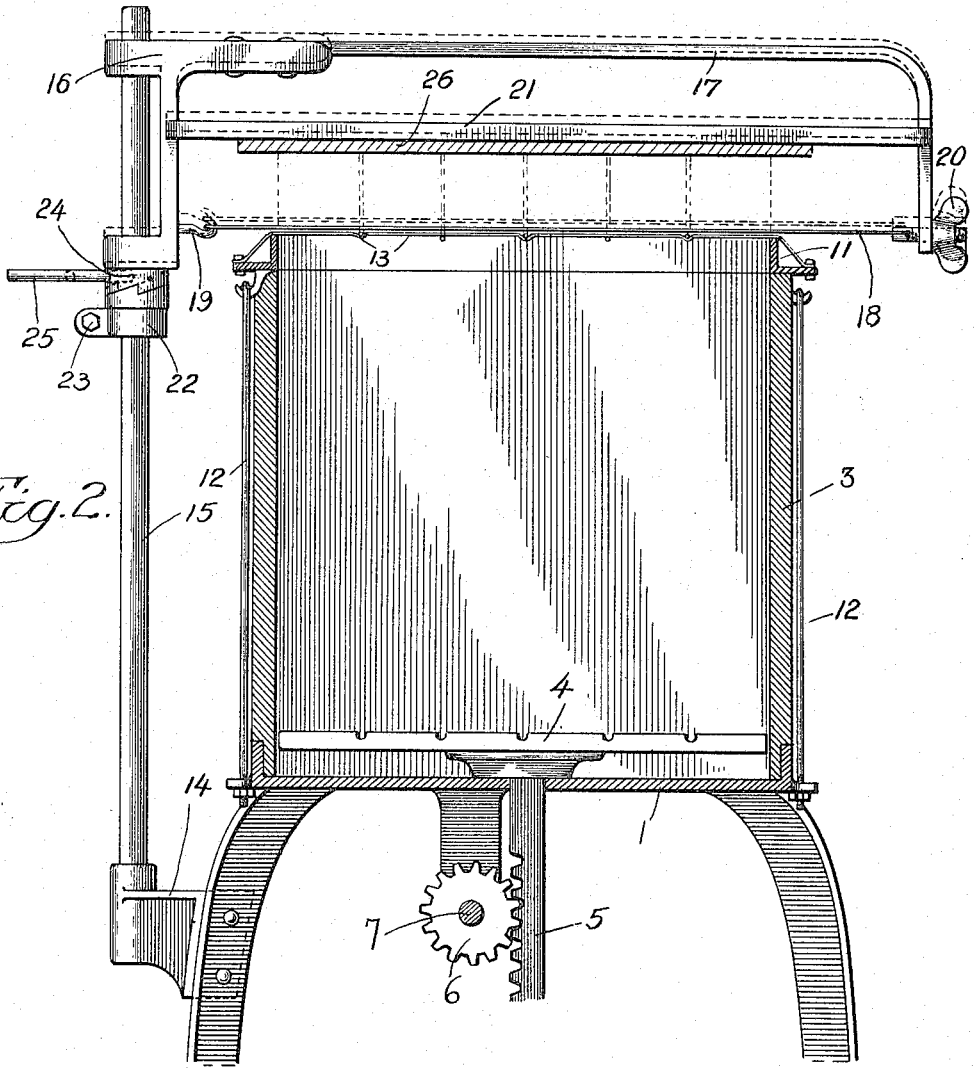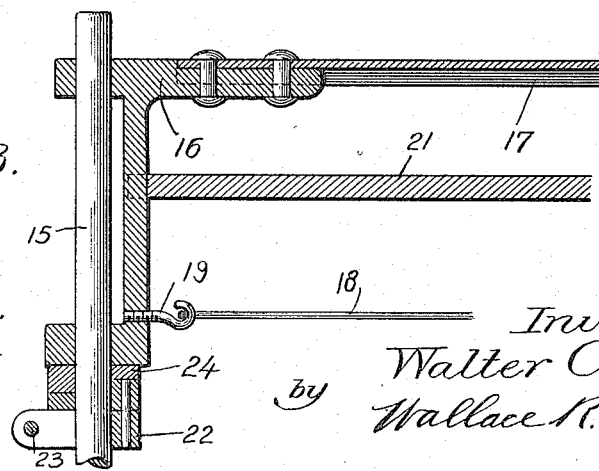

WALTER COLE, OF ELGIN, ILLINOIS.

BUTTER-CUTTER.

1,145,557. Specification of Letters Patent. Patented July 6, 1915.

Application filed November 22, 1913. Serial No. 802,342.

*To all whom it may concern:*

Be it known that I, WALTER COLE, residing at Elgin, county of Kane, and State of Illinois, have invented certain new and useful Improvements in Butter-Cutters; and I do hereby declare the following to be a full, clear, and exact description of the invention, such as will enable others skilled in the art to which it appertains to make and use the same.

The present invention relates to the art of cutting butter into rectangular prints of uniform size and weight, and is directed particularly to apparatus whereby greater uniformity in the blocks or prints of butter can be attained.

It has been customary to force the butter through a wire grid thereby making the vertical cuts, and it has been customary to thereafter draw the wire of a bow through the butter to make the transverse cut whereby the blocks or prints are completed, but in making this transverse cut there is always the danger that the bow will be tilted either forwardly or backwardly and so will yield prints somewhat under weight. It is not feasible to weigh each print before shipment, and, according to present methods, the manufacturer is exposed to just claims for short weight, even though the operators are exercising great care in making the transverse cut.

The butter cutter of my invention is so constituted structurally that the prints are always of uniform thickness as well as of uniform length and breadth.

The details of an embodiment of the invention are set forth with particularity in the accompanying description, which is to be taken in conjunction with the drawings, wherein—

Figure 1 is a perspective view showing the complete structure with the exception of a wood follower head, which may be placed on top of the butter columns preparatory to the swinging movement of the bow. Fig. 2 is a sectional elevation through the structure of Fig. 1, indicating in dotted lines the butter columns raised to position for the transverse cut; and Fig. 3 is a detail of the swinging head of the bow.

In the drawings the apparatus comprises a metal base 1 supported on legs 2 and provided with a removable body 3, into which the butter may be tamped and cooled to a firm, dense and uniform block. Within body 3 is a platform 4 mounted on rack 5 and movable upward to lift the block of butter out of body 3. Rack 5 is driven by a pinion 6 on a horizontal shaft 7 provided with a ratchet 8 actuated by a suitable swinging handle 9 equipped with a dog 10. A to and fro movement of handle 9 will progressively lift the block of butter and, after the lifting movement is completed, dog 10 can be raised to drop platform 4 into its lowermost position as shown in Fig. 2.

On the top of body 3 is a cutting frame 11 held in position by suitable anchor rods 12 and equipped with cutting wires 13 forming a grid through which the butter is forced as platform 4 rises.

In practical operation the butter is lifted through wires 13 a distance somewhat greater than the height of a print, and there then remains the operation of making the transverse cut so that the prints shall be all of exactly the proper size and neither too light nor too heavy. To effect this result, there is provided on one of the legs 2 a bracket 14, rigidly supporting a standard 15, on the upper end of which a swinging bow is pivotally mounted.

The bow consists of a swinging head 16 carrying a bent arm 17 to the lower downturned end of which is attached a cutting wire 18 strung between an anchoring hook 19 and an adjustable thumb-nut 20. This cutting wire is stretched tightly, and by its passage through the butter serves to make the transverse cut. A wooden stretcher 21 may be inserted between the outer end of the bent member 17 and casting 16, to give greater rigidity to the bow, and may have another function as hereinafter explained. As a means for adjusting the bow up and down with respect to the cutting frame, 11, there is provided a base-block 22 clamped tightly to the standard 15 by means of a bolt 23, but adjustable thereon when occasion requires, this base having its upper face provided with a cam face. A collar 24 with a corresponding cam-face to the base-block is provided with a handle 25 whereby it may be swung around between the swinging head 16 and base-block 22 to raise or lower the bow with respect to the butter to be cut. A board 26 may also be provided as a stationary follower or head over which the stretcher board 21 may slide when the swinging cut is being made.

To use the apparatus the swinging bow is swung around out of the way and the large block of butter is lifted by platform 4 through the wires 13 until it projects a suitable distance above those wires. Then the loose board 26 is laid on top of the butter and the bow is swung around toward its cutting position. It may or may not be at exactly the proper level for making the cut, but by means of handle 25 it can be adjusted vertically until stretcher 21 rests lightly on the wooden board 26, and thereafter the bow may be swung around to make the complete cut, board 26 serving as a guide and insuring a proper vertical spacing of the cut. The bow cannot tilt either forward or backward with respect to the cutting wire 18, and the blocks are of necessity all of the same size. Such effect as the swinging movement may have on the adjusting collar 24 tends to drop that collar leaving the bow freely movable over board 26, or in other words, there is no tendency toward shifting the bow upward while the swing is being made.

If desired the follower board 26 may be omitted entirely and the cut may be made with the cutting wire, which may be substituted for the stretcher board 21, sliding directly over the surface of the butter, for even under these circumstances the bow cannot tilt and the accuracy of cutting is much greater than when the movement of the bow is controlled wholly by hand.

I claim:

1. In a butter cutting machine having a body for holding the butter and a platform movable upward through said body to eject the butter through a wire grid, the combination of a rigid standard, a cutting bow swinging about said standard, and means for vertically adjusting said bow with respect to said wire grid preparatory to making a transverse cut through the butter.

2. In a butter cutter, the combination of a body wherein the butter may be packed, a wire grid for said body, means for ejecting the butter through said grid to make vertical cuts therein, a standard rigidly positioned with respect to said body, a cutting bow mounted to swing on said standard, and adjusting means for raising or lowering said bow on said standard preparatory to its movement through the butter.

3. In a butter cutting machine having a frame, a wire grid and means for lifting butter through said grid to make vertical cuts therein, the combination of a swinging element adapted to make a transverse cut through the butter, and means for adjustably and pivotally supporting said element to regulate the depth of its cut in the butter.

4. In a butter cutting machine having a body wherein butter may be packed, a cutting grid and means for ejecting said butter through said grid to make cuts in the butter, the combinations of a vertical standard, a bow pivoted to swing about said standard and carrying a tightly stretched cutting wire, and adjusting means for raising said bow on said standard preparatory to its swinging movement through the butter.

5. In a butter cutting machine having a body wherein the butter may be packed and a platform movable upward through said body to eject the butter through a wire grid, the combination with a support, a bow pivoted to swing about said support, a gage mounted in said bow, a tightly stretched cutting wire carried by the bow, means for adjusting said wire and means for raising the bow on the support preparatory to its swinging movement through the butter.

6. In a butter cutter having a body, a wire grid, and means for lifting the butter out of the body through the grid, the combination of a suitable support, a casting carried by the support and pivotally mounted thereon, a bent member extending from said casting and an adjustable cutting wire strung between said casting and bent member.

7. In a butter cutter having a body, a wire grid, a means for lifting the butter out of the body through the grid, the combination of a vertical support, a base block carried by the support, a collar rotatably mounted on said base block, a bow resting upon said collar, and a cutting wire carried by the bow for the purpose specified.

8. In a butter cutter having a body, a wire grid, a means for lifting the butter out of the body through the grid, a bracket carried by the body, a standard carried by the bracket, a base block rigidly mounted upon said standard, a collar rotatably mounted upon said standard and resting upon said block, a bow pivotably mounted upon said standard and resting upon said block, a cutting wire carried by said bow, adjusting means interposed between said base block and collar whereby the bow will be raised on said standard preparatory to its swinging movement through the butter and a handle carried by the collar for operating said adjusting means for the purpose specified.

In witness whereof, I hereunto subscribe my name to this specification in the presence of two witnesses.

WALTER COLE.

Witnesses:
 WILLIAM C. LINTON,
 I. V. CURRAN.

Copies of this patent may be obtained for five cents each, by addressing the "Commissioner of Patents, Washington, D. C."